April 18, 1961 G. H. ATKINSON 2,980,644
PRODUCTION OF CALCIUM SILICATE
Filed Nov. 24, 1954
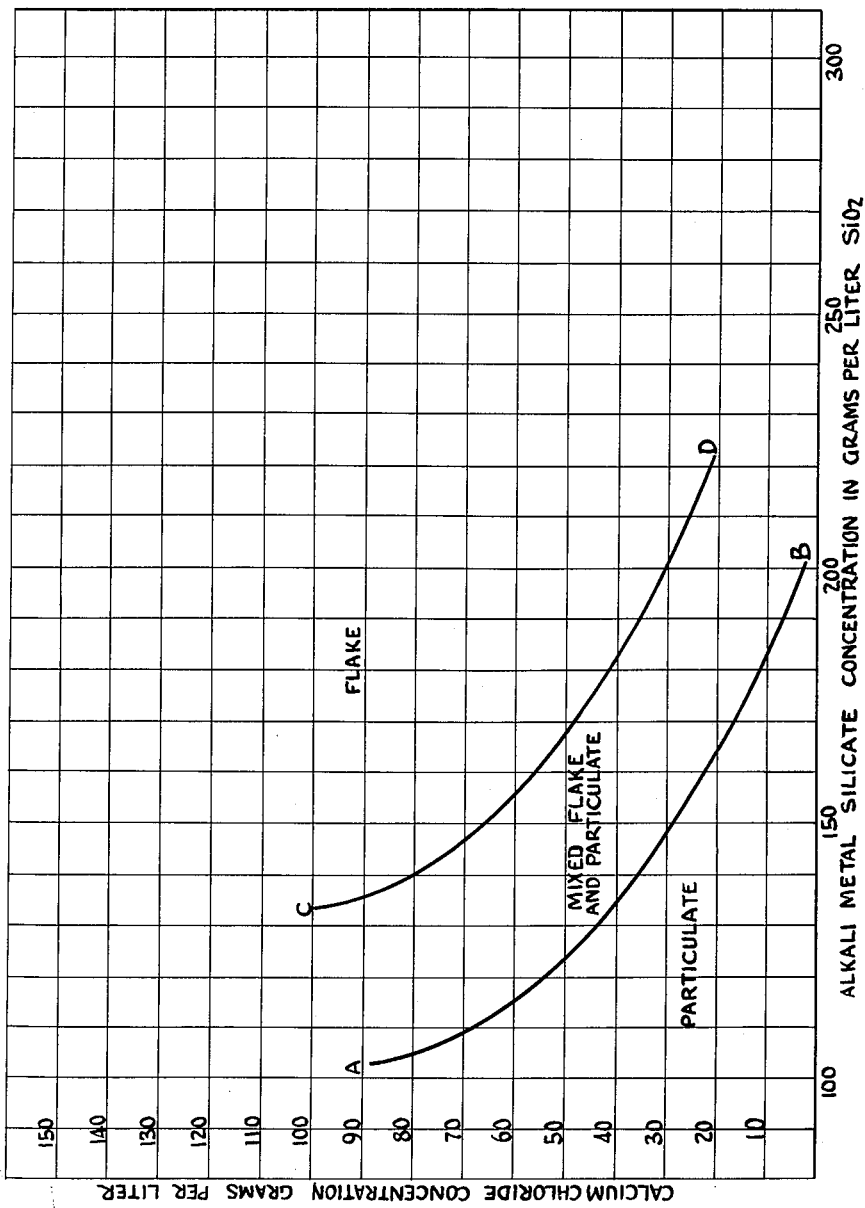
INVENTOR.
GEORGE H. ATKINSON
BY
Oscar L. Spencer
ATTORNEY

United States Patent Office 2,980,644
Patented Apr. 18, 1961

2,980,644

PRODUCTION OF CALCIUM SILICATE

George H. Atkinson, Akron, Ohio, assignor, by mesne assignments, to Pittsburgh Plate Glass Company Filed Nov. 24, 1954, Ser. No. 470,864

10 Claims. (Cl. 260—41.5)

This invention relates to a novel method of preparing calcium silicate and to the products produced thereby. According to this invention, finely divided calcium silicate in the form of flakes as distinguished from finely divided microscopic particles has been prepared. This product is especially suitable as a reinforcing pigment in the preparation of synthetic and natural rubber compositions and as a paper or paint pigment.

Calcium silicate is generally prepared by the interaction in an aqueous medium of a calcium salt with a suitable sodium silicate such as sodium or other alkali metal silicate. The molecular ratio of $SiO_2$ to CaO in the silicate thus prepared is preferably maintained above about 2, optimum results being obtained when the ratio is about 3.3. It has been claimed in U.S. Patent No. 2,204,113 that a product having an average particle size of 0.3 micron may be prepared by maintaining a uniform concentration of reactants throughout a reaction medium, said uniformity being brought about by means of a reaction vessel equipped with a stirrer. Products of even finer ultimate particle size have also been prepared. Such products when examined under an electron microscope are found to be composed of finely divided apparently amorphous spherical particles agglomerated in the form of flocs or larger porous particles of irregular shape.

One serious objection to calcium silicate as previously made has been its poor dispersibility in rubber. Thus calcium silicate-rubber compositions frequently have been observed to exhibit small white specks which are unsightly.

According to this invention, a new calcium silicate having superior dispersibility properties in rubber has been provided. This calcium silicate is in the form of flakes or film or plate-like, non-crystalline particles of substantial size usually ranging up to about 10 microns across a long dimension and having various and irregular cross sections. The thickness of these flakes ranges from 100 A. to 800 A., usually between 200 and 300 A. In contrast to the prior precipitated calcium silicate flocs, these flakes or plate-like particles do not appear to be made up of particles of smaller ultimate particle size.

According to a further embodiment of the invention, it has been found that the flake calcium silicate herein contemplated may be prepared by careful correlation of the concentration of the alkali metal silicate and calcium salt solution with the final concentration of calcium salt in the reaction mixture, while subjecting the mixture to intensive agitation. The exact concentration of calcium salt, such as calcium chloride, which must be present in the ultimate reaction mixture depends to a substantial degree upon the concentration of sodium silicate or equivalent alkali metal silicate used in the reaction. Most conveniently, it has been found desirable to effect reaction of a calcium salt solution with an alkali metal silicate solution containing at least about 135 to 150 grams per liter of $SiO_2$ as the alkali metal silicate. It is also necessary to use sufficient calcium chloride, in excess of the amount which will react with the sodium silicate or other alkali metal silicate, to provide in the reaction mixture a comparatively high concentration of calcium chloride. Preferably, this calcium chloride concentration should be in excess of about 50 grams per liter of reaction product mixture.

The attached drawing diagrammatically illustrates the conditions under which the particulate type of calcium silicate known to the prior art and the novel flake calcium silicate herein contemplated may be prepared. The curve denoted by lines C and D in the drawing substantially illustrates the limiting conditions for production of a product which is substantially wholly flake calcium silicate. That is, by reacting a calcium salt with sodium silicate or other alkali metal silicate under conditions which are to the right of curve CD, it is possible to obtain a product which is substantially wholly flake calcium silicate. Mixed flake and particulate calcium silicate may be prepared by operating under conditions between lines AB and CD.

In the above mentioned figure, the results which are obtained by reaction of calcium chloride with alkali metal silicate are illustrated. The abscissa denotes the initial concentration of alkali metal silicate used in effecting this reaction as expressed in grams per liter of $SiO_2$ in the alkali metal silicate. The ordinate designates the final calcium chloride concentration in grams per liter of $CaCl_2$ which is present in the reaction product mixture, i.e., the final calcium chloride concentration.

From an inspection of these curves, it will be apparent that when a solution which contains sodium silicate in concentration equivalent to 150 grams per liter of $SiO_2$ is reacted with calcium chloride solution in a proportion such that the calcium chloride content of the ultimate mixture is 10 grams per liter of $CaCl_2$, the product is calcium silicate in the form of flocs, as described above. On the other hand, where sufficient calcium chloride is used to establish a final calcium chloride concentration of 50 grams per liter of $CaCl_2$, a product which consists of mixed flake and particulate calcium silicate is produced, and, where the final calcium chloride concentration is raised to 70 grams per liter, the product is substantially entirely flake. It will be observed, also, that when the silicate concentration is increased to 175 grams per liter of $SiO_2$, a product which is substantially wholly flake calcium silicate is produced even when the calcium chloride concentration is only about 50 to 55 grams per liter of $CaCl_2$.

Because of the high viscosity of the concentrated sodium silicate, thorough intermixing of the reactants is extremely difficult, and it has been found according to a further embodiment of this invention that adequate intermixing may be effected by providing a very high energy of agitation in the system at the point of contact of the silicate with the calcium salt solution. Energetic agitation at the point of mixing of the silicate and calcium chloride solutions is an important manipulative step in producing the desired product. It has been found that a high degree of agitation may be achieved by using a centrifugal pump having, in its face plate, inlets for the individual reactants and an outlet or outlets for the product produced. Obviously, variations in the location and number of said inlets and outlets may be made without deviating from the scope of this invention. Particularly good results have been obtained by introducing the calcium chloride solution in the central area of the pump face and the sodium silicate at a point along the periphery and by removing the product at another point along said periphery. Good results were obtained when both reactants were introduced into the central area and the products removed at the periphery.

Alternatively, the precipitation may be carried out in a jet mixing device consisting of a T-shaped tube through which the calcium chloride solution flows at high velocity while the silicate solution is injected into this stream at right angles to it from the side arm. Such devices are well known to be effective mixers due to highly turbulent flow conditions at the point of junction of the two streams.

Although regulated concentrations of reactants are important in the achievement of the objectives of this invention, numerous variations in these concentrations may be made within the scope of the invention without appreciably altering the desired product. Thus, the silicate such as sodium or other alkali metal silicate which has been used in the practice of this invention has the composition $(Na_2O)(SiO_2)_x$, wherein $x$ is a number from about 1-5, including fractional numbers, normally above 2. In general, the process is conducted using the silicate in which $x$ is 3.3.

In the practice of this invention, as stated above, a substantial excess of unreacted calcium chloride is maintained in the reaction product mixtures. Thus a reaction product having a final concentration of at least about 50 grams per liter, preferably about 70 grams per liter, of calcium chloride affords a calcium silicate which is preponderantly flaked. A final concentration of 70 grams per liter of calcium chloride provides a silicate which is completely flaked. It is not known why the unusual plate-like form results, but it has been found that by carefully coordinating the reaction conditions hereinabove disclosed, that is, by regulating the $SiO_2$ concentration, by providing intense agitation in the reaction zone and by carefully maintaining an excess of unreacted calcium chloride in the reaction product mixture, a preponderantly flaked calcium silicate results. This product differs materially in appearance from the flocked silicate of the prior art.

In carrying out the reaction an alkali metal silicate solution initially containing above about 135 grams of $SiO_2$ as alkali metal silicate per liter of solution is desired and this concentration may be as high as 225-300 grams of $SiO_2$ per liter or above. Usually, however, solutions having a silicate concentration of 150-200 grams of $SiO_2$ per liter are preferred. The thickness of the resulting flake appears to be dependent to a great degree upon the concentration of $SiO_2$ in the reaction mixture. Thus, if the $SiO_2$ concentration is increased from 175 grams per liter to 200 grams per liter the flake thickness is increased markedly.

The calcium salt most suitable for use in this reaction is calcium chloride, although other calcium salts which are readily soluble in water, such as calcium nitrate or acetate, may be used. Concentrations of calcium salt of at least about 100 grams per liter are preferred, yet a concentration range of 50 to 200 grams per liter may be employed. The calcium salt may contain a certain amount of NaCl without affecting the reaction.

The composition of the calcium silicate produced may be expressed by the formula $(CaO)(SiO_2)_x$, wherein $x$ is a number from 1 to 5, including fractional numbers. The magnitude of $x$ is dependent upon and corresponds to the ratio of $Na_2O$ to $SiO_2$ in the sodium silicate from which the calcium silicate has been prepared. Thus, where $Na_2O(SiO_2)_{3.3}$ is used, the mol ratio of $SiO_2$ to $CaO$ in the calcium silicate is approximately 3.3.

In carrying out the process of this invention, the reactants may be agitated in any suitable manner, as shown above, which will effect rapid intimate intermixing. It has been found according to this invention that good agitation at the point of contact of the silicate with the chloride solution can be obtained by utilizing a special pump arrangement. One very satisfactory method comprises introducing one reactant such as the calcium salt solution in the central area of a centrifugal pump where, by virtue of the rotating blades of the pump, the reactant is thrown radially outward at high velocity and the other reactant such as the silicate is introduced at a point or points along the periphery of the pump. It is important that the speed of agitation be high. It will be apparent from the examples that here again variations are tolerable within certain ranges. When using the aforementioned special pump arrangement, it is desirable to control the rate of flow of the reactants into and from the system to supply a smaller amount of reaction mixture than the pump can discharge. In such a case, improved agitation is effected. Good results are obtained when the calcium salt solution is introduced by gravity flow and the peripherally-introduced silicate is injected by means of an auxiliary pump. By throttling the reaction product discharge from the pump it is possible to keep the reaction chamber full of liquid and effect the intimate intermixing desired.

The following examples are illustrative of preferred specific embodiments:

*Example I*

An Eastern Industries D-11 centrifugal pump with a chamber 3½ inches internal diameter and 7/16 inch deep is used, said pump being provided with a four-bladed impeller having a diameter of 3 3/16 inches and driven at the rate of about 3500 r.p.m. The cast plate provided with this pump to serve as a face for the chamber is replaced with a sheet of transparent plastic which permits observation of the flow in the pump while operating. A 3/8 inch nipple is screwed into the center of the plastic plate to replace the normal pump feeding opening. This serves as a point of entry at substantially the center of the pump for the calcium chloride solution which is delivered to the pump by gravity flow under a pressure of about 1 atmosphere. The silicate solution is introduced through the face plate at a point 1½ inches from the center thereof and in a position which might be described in analogy to a clock as at about twenty-five minutes with respect to the hour. The silicate solution is injected through a rubber tube held in a length of metal tubing threaded into the plate. In effect, the silicate enters through a rubber jet having about a 1/16 inch internal diameter and emerges from the jet at a point close to the revolving impeller blades. At the silicate feed rate of 177 cubic centimeters per minute, the lineal exit velocity of the solution from the jet to the chamber is about 5 feet per second. The chamber discharge is conventional through a 3/8 inch opening in the circumference located relative to the silicate injector as at fifteen minutes before the hour. The capacity of this pump being of the order of seven gallons per minute at zero head it is necessary to throttle the discharge to maintain the chamber full of liquid during these operations. It becomes necessary, therefore, to force the silicate solution into the precipitation pump with an auxiliary pump.

Into the reaction pump just described is fed an aqueous solution containing 175 grams per liter of $SiO_2$ as $(Na_2O)(SiO_2)_{3.3}$ and an aqueous solution containing 100 grams per liter of $CaCl_2$ and 40 grams per liter of NaCl. The feed rates are 177 cubic centimeters per minute and 1000 cubic centimeters per minute, respectively. The product is a highly flocculated and relatively free filtering slurry which dries at a temperature of 105° C., after washing, to granular white cakes.

The following table sets forth the conditions of other experiments performed by this procedure:

TABLE I

*Precipitation conditions*

| Feed Concentrations | | | Feed rates | | Calculated Concentration of $CaCl_2$ in reacting system, grams per liter |
|---|---|---|---|---|---|
| Sodium Silicate as grams of $SiO_2$ per liter | $CaCl_2$ grams per liter | NaCl grams per liter | Sodium Silicate Solution, cubic centimeter per minute | Calcium Chloride Solution, cubic centimeter per minute | |
| 225 | 100 | 40 | 177 | 1,000 | 52 |
| 200 | 100 | 40 | 177 | 1,000 | 56 |
| 175 | 100 | 40 | 177 | 1,000 | 70 |
| 175 | 200 | 80 | 177 | 1,000 | 155 |

These feed concentrations and rates yield a material of unique and characteristic structure in which the observable ultimate entity under an electron microscope is a highly-structured, tissue-paper-like flake and not a particle or the usual aggregate of particles. Decreasing the $SiO_2$ concentration in the feed to 100 grams per liter while using calcium chloride solution containing 100 grams per liter of calcium chloride produces a poorly-dispersing pigment possessing no flake structure and being composed of aggregated or flocked particles.

A sample of the film or plate type pigment prepared according to Example I has been tested in a GR–S soling compound recipe. Comparison is provided with a control stock prepared with commercial finely divided calcium silicate having an average ultimate particle size below 0.05 micron.

TABLE II

| Recipe | A | B |
| --- | --- | --- |
| GR–S–1500 | 75.0 | |
| Marbon 8000 (styrene-butadiene resin) | 25.0 | |
| Zinc Oxide | 5.0 | |
| Sulfur | 3.0 | |
| Stearic Acid | 1.0 | |
| Akroflex C (35% diphenyl-p-phenylenediamine, 65% phenyl-alpha-naphthylamine) | 1.0 | |
| Santocure (N-cyclohexyl-3 benzothiazole sulfamamide) | 1.0 | |
| D.O.T.G. (di-ortho-tolyl-guanidine) | 0.25 | |
| Cumar MH2½ (polymers of indene, coumarone and associated coal-tar compounds) | 5.0 | |
| Commercial Calcium Silicate | 90.0 | |
| Product of Example I | | 90.0 |

The compound prepared with the experimental pigment (B) is superior to that made from commercial calcium silicate (A) in terms of modulus, tensile and tear strengths as seen from Table III.

TABLE III

| Compound | Cure at 320° F. min. | Modulus | | Tensile, pounds per square inch | Elongation, percent | Tear, pounds per inch |
| --- | --- | --- | --- | --- | --- | --- |
| | | 100% | 300% | | | |
| A | 5 | 790 | 1,130 | 1,590 | 440 | 310 |
| | 10 | 1,040 | 1,530 | 1,530 | 300 | 340 |
| | 15 | 1,090 | 1,620 | 1,620 | 300 | 350 |
| | 20 | 1,150 | | 1,570 | 260 | 340 |
| | 30 | 1,080 | | 1,590 | 260 | 360 |
| B | 5 | 1,150 | 1,820 | 2,070 | 300 | 370 |
| | 10 | 1,390 | | 2,060 | 290 | 370 |
| | 15 | 1,460 | | 2,070 | 270 | 380 |
| | 20 | 1,480 | | 2,000 | 270 | 350 |
| | 30 | 1,460 | | 1,900 | 240 | 350 |

OVEN AGED 96 HRS. AT 100° C.

| | | | | | | |
| --- | --- | --- | --- | --- | --- | --- |
| A | 5 | 1,790 | | 1,890 | 170 | |
| | 10 | 2,030 | | 2,030 | 120 | |
| | 15 | 2,080 | | 2,110 | 120 | |
| | 20 | 1,960 | | 2,000 | 120 | |
| | 30 | 1,870 | | 2,010 | 120 | |
| B | 5 | 2,510 | | 2,580 | 120 | |
| | 10 | 2,580 | | 2,580 | 100 | |
| | 15 | 2,580 | | 2,580 | 100 | |
| | 20 | 2,520 | | 2,600 | 110 | |
| | 30 | 2,450 | | 2,450 | 100 | |

Also, the dispersibility of the novel calcium silicate of this invention as measured in GR–I and in cured GR–S is very consistent. The level of dispersibility represents a substantial improvement over that of commercial finely-divided calcium silicate having an average ultimate particle size below 0.05 micron. The flaked calcium silicate herein contemplated, because of its unusually good dispersibility, is particularly suitable as a rubber pigment, particularly for the reinforcement of rubber compositions including both natural rubber and synthetic rubber compositions, such as the butadiene-styrene copolymers known as GR–S rubber which are copolymers of 10 to 60 percent by weight of styrene and 90 to 40 percent by weight of butadiene, butadiene-acrylonitrile copolymers derived by copolymerization of 40 to 90 percent by weight of butadiene and 60 to 10 percent of acrylonitrile, neoprene rubber, isobutylene polymers and copolymers of isobutylene with 0.01 to 4.0 percent of isoprene (based upon the weight of isobutylene) or other elastomers prepared by polymerization of butadiene-1,3, isoprene, piperylene, 2,3-dimethyl butadiene, 2-chlorobutadiene-1,3 or other comparable polymerizable compound alone or in admixture with one or more organic, monomeric or ethylenic compounds including acrylonitrile, isobutylene, vinyl chloride, vinyl acetate, styrene, methyl methacrylate, methyl alphachloroacrylate, methyl acrylate and the like.

Silicates of other alkaline earth metals, such as magnesium, barium or strontium silicates, may be prepared by use of equivalent amounts of the corresponding water soluble salts of such alkaline earth metals (magnesium chloride, barium chloride, magnesium nitrate, strontium nitrate or the like) in lieu of all or a part of the calcium chloride or like salt.

Other alkali metal silicates and mixtures thereof may be used in this process in lieu of sodium silicate. Also mixtures containing aluminum chloride, zinc chloride, aluminum nitrate, sodium aluminate, etc., in addition to the silicate, are employable in addition to the calcium chloride and sodium silicate or in lieu of a portion thereof.

Although specific embodiments of the invention have been disclosed herein, it is not intended that the invention be limited thereto, for it will be obvious to those skilled in the art that numerous modifications such as variations in the amount, type, or character of the reactants, variations in the concentration of the reactants and variations in the rate at which the reactants are introduced into the reaction vessel are within the spirit and scope of the appended claims.

I claim:

1. A method of producing a finely divided calcium silicate preponderantly in the form of fine, non-crystalline flakes of substantial size and ranging up to 10 microns across the long dimension, having a thickness ranging from about 100 A. to 800 A., having the composition $CaO(SiO_2)_x$ where $x$ is a value between 1 and 5 flakes which comprises reacting an aqueous solution of sodium silicate containing at least about 135 grams per liter of $SiO_2$ as sodium silicate with an aqueous solution of calcium chloride while subjecting the reactants to intense agitation and maintaining throughout substantially the entire reaction period a concentration of unreacted calcium chloride in the reaction mixture of at least about 50 grams per liter.

2. A method of producing a finely divided alkaline earth metal silicate preponderantly in the form of fine, non-crystalline flakes of substantial size ranging up to 10 microns across the long dimension and having a thickness ranging from about 100 A. to 800 A. which comprises reacting an aqueous solution of alkali metal silicate containing at least about 135 grams per liter of $SiO_2$ with an aqueous solution of an alkaline earth metal salt while subjecting the reactants to intense agitation and maintaining, throughout substantially the entire reaction period a concentration of unreacted alkaline earth metal salt in the reaction mixture of at least about 50 grams per liter.

3. A method of preparing calcium silicate in flake, non-crystalline form of substantial size and having a thickness ranging from 100 A. to 800 A., a long dimension ranging up to 10 microns and having the composition $CaO(SiO_2)_x$, where $x$ is a number between 1 and 5, which comprises reacting an aqueous solution of calcium chloride with an aqueous solution of sodium silicate while subjecting the reactants to intense agitation and correlating throughout substantially the entire reaction period the concentration of the sodium silicate reactant and the concentration of unreacted calcium chloride in the reaction mixture within the area to the right of curve AB of the drawing.

4. A method of preparing calcium silicate in flake, non-crystalline form of substantial size and having a thickness ranging from 100 A. to 800 A., a long dimension ranging up to 10 microns and having the composition $CaO(SiO_2)_x$, where $x$ is a number between 1 and 5, which comprises reacting an aqueous solution of calcium chloride with an aqueous solution of sodium silicate while subjecting the reactants to intense agitation and correlating throughout substantially the entire reaction period the concentration of the sodium silicate reactant and the concentration of unreacted calcium chloride in the reaction mixture within the area to the right of curve CD of the drawing.

5. A method of preparing an alkaline earth metal silicate in flake, non-crystalline form of substantial size and having a thickness ranging from about 100 A. to 800 A. and a long dimension ranging up to 10 microns which comprises reacting an aqueous solution of an alkaline earth metal salt with an aqueous solution of an alkali metal silicate while subjecting the reactants to intense agitation and correlating throughout substantially the entire reaction period the concentration of the alkali metal silicate reactant and the concentration of unreacted alkaline earth metal salt in the reaction mixture within the area to the right of curve AB of the drawing.

6. A method of preparing an alkaline earth metal silicate in flake, non-crystalline form of substantial size and having a thickness ranging from about 100 A. to 800 A. and a long dimension ranging up to 10 microns which comprises reacting an aqueous solution of an alkaline earth metal salt with an aqueous solution of an alkali metal silicate while subjecting the reactants to intense agitation and correlating throughout substantially the entire reaction period the concentration of the alkali metal silicate reactant and the concentration of unreacted alkaline earth metal salt in the reaction mixture within the area to the right of curve CD of the drawing.

7. Finely-divided, precipitated calcium silicate preponderantly in the form of fine, non-crystalline flakes of substantial size and ranging up to 10 microns across, a long dimension, having a thickness ranging from about 100 A. to 800 A., and having the composition $CaO(SiO_2)_x$, where $x$ is a number between 1 and 5.

8. Finely-divided, precipitated, alkaline earth metal silicate preponderantly in the form of fine, non-crystalline flakes of substantial size and ranging up to 10 microns across a long dimension, having a thickness ranging from 100 A. to 800 A. and in which the ratio of $SiO_2$ to alkaline earth metal oxide is between 1 and 5.

9. A composition which comprises rubber having well dispersed therein finely divided precipitated alkaline earth metal silicate preponderantly in the form of fine, non-crystalline flakes of substantial size and ranging up to 10 microns across the long dimension and having a thickness ranging from about 100 A. to 800 A., said rubber being selected from the group consisting of natural rubber, butadiene-styrene copolymers and butadiene-acrylonitrile copolymers.

10. A composition which comprises rubber having well dispersed therein finely divided precipitated calcium silicate preponderantly in the form of fine, non-crystalline flakes of substantial size and ranging up to 10 microns across of the long dimension and having a thickness ranging from about 100 A. to 800 A., the calcium silicate having the composition $CaO(SiO_2)_x$ wherein $x$ is a value between 1 and 5, said rubber being selected from a group consisting of natural rubber, butadiene-styrene copolymers and butadiene-acrylonitrile copolymers.

References Cited in the file of this patent

UNITED STATES PATENTS

| | | |
|---|---|---|
| 2,204,113 | Allen | June 11, 1940 |
| 2,287,700 | Muskat et al. | June 23, 1942 |
| 2,537,908 | Pechukas | Jan. 9, 1951 |
| 2,539,397 | Bottoms et al. | Jan. 30, 1951 |
| 2,547,127 | Kalousek | Apr. 3, 1951 |
| 2,665,996 | Kalousek | Jan. 12, 1954 |
| 2,754,547 | Allen | July 17, 1956 |

FOREIGN PATENTS

| | | |
|---|---|---|
| 570,856 | Germany | Feb. 22, 1933 |

OTHER REFERENCES

Bureau of Mines, Research Paper 1147, pages 617–638.

UNITED STATES PATENT OFFICE
CERTIFICATE OF CORRECTION

Patent No. 2,980,644                                April 18, 1961

George H. Atkinson

It is hereby certified that error appears in the above numbered patent requiring correction and that the said Letters Patent should read as corrected below.

Column 1, line 48, for "irrergular" read -- irregular --; column 6, line 40, strike out "flakes".

Signed and sealed this 10th day of July 1962.

(SEAL)
Attest:

ERNEST W. SWIDER                                    DAVID L. LADD
Attesting Officer                                       Commissioner of Patents